US011530158B2

(12) United States Patent
Trom

(10) Patent No.: US 11,530,158 B2
(45) Date of Patent: Dec. 20, 2022

(54) AMORPHOUS SILICA PRODUCTS, ARTICLES, AND PARTICLES AND METHODS OF PRODUCING AMORPHOUS SILICA PRODUCTS, ARTICLES, AND PARTICLES FROM CONCRETE

(71) Applicant: Xaris Holdings, LLC, Spring, TX (US)

(72) Inventor: Scott D. Trom, Spring, TX (US)

(73) Assignee: Xaris Holdings, LLC, Spring, TX (US)

( * ) Notice: Subject to any disclaimer, the term of this patent is extended or adjusted under 35 U.S.C. 154(b) by 748 days.

(21) Appl. No.: 16/548,195

(22) Filed: Aug. 22, 2019

(65) Prior Publication Data
US 2021/0053865 A1 Feb. 25, 2021

(51) Int. Cl.
| | | |
|---|---|---|
| *C03C 1/00* | (2006.01) | |
| *C03B 1/00* | (2006.01) | |
| *B09B 3/29* | (2022.01) | |
| *C03C 3/083* | (2006.01) | |
| *C03B 18/02* | (2006.01) | |
| *C03C 3/087* | (2006.01) | |

(52) U.S. Cl.
CPC ................ *C03C 1/002* (2013.01); *B09B 3/29* (2022.01); *C03B 1/00* (2013.01); *C03B 18/02* (2013.01); *C03C 3/083* (2013.01); *C03C 3/087* (2013.01)

(58) Field of Classification Search
CPC .................................. C03C 1/002; B09B 3/29
See application file for complete search history.

(56) References Cited

U.S. PATENT DOCUMENTS

| | | | |
|---|---|---|---|
| 4,998,486 A * | 3/1991 | Dighe | ........................ B09B 1/00 |
| | | | 588/407 |
| 5,554,352 A | 9/1996 | Jaques et al. | |
| 7,998,448 B2 | 8/2011 | Kondoh et al. | |
| 2012/0022311 A1* | 1/2012 | Marrillet | ................. C03C 1/002 |
| | | | 588/11 |
| 2015/0053118 A1 | 2/2015 | Yin | |
| 2019/0225851 A1 | 7/2019 | Trom et al. | |
| 2020/0002215 A1 | 1/2020 | Trom et al. | |

FOREIGN PATENT DOCUMENTS

| | | | | |
|---|---|---|---|---|
| JP | 10001326 A * | 1/1998 | ............. | C03C 1/002 |
| WO | 1997045376 A1 | 12/1997 | | |

OTHER PUBLICATIONS

International Search Report and Written Opinion received for International PCT Application No. PCT/US2020/47592, dated Nov. 9, 2020, 22 Pages.

* cited by examiner

*Primary Examiner* — Erin Snelting
(74) *Attorney, Agent, or Firm* — Bernard G. Pike; Pike IP Law

(57) ABSTRACT

Concrete may be melted to form a glass product. Methods and batch compositions including concrete may be used to produce amorphous silica materials including, but not limited to, glass, container glass, fiber glass, glass bead, glass spheres, sheet or plate glass, glass aggregate, glass sand, abrasives, proppants, foamed glass, and manufactured glass articles. The initial processing steps include preparing a melt batch comprising concrete and, optionally, other components, melting the melt batch, and cooling the melted melt batch. Further processing steps may be utilized to produce the glass article.

29 Claims, No Drawings

AMORPHOUS SILICA PRODUCTS, ARTICLES, AND PARTICLES AND METHODS OF PRODUCING AMORPHOUS SILICA PRODUCTS, ARTICLES, AND PARTICLES FROM CONCRETE

TECHNICAL FIELD

Embodiments of the method of invention comprise producing amorphous silica glass products, articles, particles, sheets, fibers, or other amorphous silicate products from natural crystalline silica sand, glass cullet, concrete including new and recycle Portland cement concrete. Concrete comprises aggregates that may include crystalline silica. However, airborne crystalline silica has been determined to be a hazardous substance that has been shown to cause silicosis if inhaled.

Embodiments of a method include heating concrete a temperature in which a significant portion of the crystalline silica is converted into amorphous silica. For example, concrete such as recycled Portland cement concrete may be mixed with other components to provide the desired properties to assist in processing and/or product properties such as, but not limited to, melting temperature, melt viscosity, process efficiency, density, toughness, hardness, or other desired properties.

For example, recycled concrete may be heated in the presence of fluxing components, density increasing components, hardness increasing components, decolorants, and other property enhancing components. The density increasing components may be metal oxides, metal silicates, silicides, aluminum oxide, zirconium oxide, clays comprising aluminum oxide, zirconium oxide, or a combination of aluminum oxide, iron oxide, and zirconium oxide. Other density increasing components include titanium oxide and other transition metal oxides.

Embodiments also include products produced from the concrete or recycle Portland cement concrete. For example, embodiments of the products include crystalline silica free sand, gravel, cullet, blasting abrasives, concrete mixes, grout, manufactured stone, mortar, bricks, concrete blocks, other concrete products, pavers, glass, container glass, flat glass, and other products that would benefit from the inclusion of concrete or recycled concrete.

BACKGROUND

Approximately ten billion tons of concrete are manufactured each year. Concrete is used for building many structures including roads, sidewalks, bridges, buildings, driveways, walls, and parking areas, for example. As these structures reach the end of their useful life or are to be removed for new construction, the concrete is typically demolished and considered a waste material.

This waste concrete may be sent to a land fill or recycled. Concrete recycling is an increasingly common method of utilizing the waste. Though there is not enough demand for recycled concrete and, therefore, concrete is routinely trucked to landfills for disposal.

Concrete aggregate collected from demolition sites may be put through a crushing machine to reduce the size of the aggregate. Crushing facilities accept only uncontaminated concrete, which must be free of trash, wood, paper and other such materials. Metals such as rebar are accepted, since they can be removed with magnets and other sorting devices and melted down for recycling elsewhere. The remaining aggregate chunks are sorted by size with larger chunks passing through the crusher again until the desired size is reached. After crushing has taken place, other particulates are filtered out through a variety of methods including hand-picking and water flotation.

However, the concrete aggregate may comprise sand. It has been found that respirable airborne particles of crystalline silica sand may enter the lungs of people in and around any area. Respirable crystalline silica sand in the lungs may result in the development of silicosis and a host of other illnesses. Silicosis is one of the world's oldest known occupational diseases, with reports of employees contracting the disease dating back to ancient Greece.

Airborne crystalline silica dust may be produced during the manufacturing, recycling and reuse process of the concrete.

There is a need for additional methods of using, reusing and recycling concrete and production of safe products from waste concrete.

SUMMARY

Embodiments of the method may be used to produce amorphous silica materials including, but not limited to, glass, container glass, fiber glass, glass bead, glass spheres, sheet or plate glass, glass aggregate, glass sand, abrasives, proppants, foamed glass, and manufactured glass articles. The initial processing steps include preparing a melt batch comprising concrete and, optionally, other components, melting the melt batch, and cooling the melted melt batch. Further processing steps may be utilized to produce the glass article. These finishing processing steps are known in the art and may be applied as known in the art during the cooling step or in addition to the method. Such steps are used to produce the glass, container glass, fiber glass, glass bead, glass spheres, sheet or plate glass, glass aggregate, glass sand, abrasives, proppants, foamed glass, and manufactured glass articles. Typical content of OPCC of approximately 81% $SiO_2$, 13% CaO, <0.7% $Fe_2O_3$, and <5% aluminum oxide makes it an effective feedstock in varying amounts for nearly all types of glass by balancing total oxide contents in the desired finished glass with supplemental oxides from separate sources of silicon dioxide, boron trioxide, aluminum oxide, magnesium oxide, zinc oxide, sodium oxide, potassium oxide, iron oxide, titanium oxide, etc. These components may be added to a glass batch alone or in combination.

Embodiments of a method of producing a manufactured glass article comprise melting concrete. Concrete is a mixture comprising Portland cement (Types I though V) or blended cement (Types IL, IS, IP, or IT), aggregate (coarse and fine), water of hydration, and, optionally, admixtures. The admixtures may include mineral (fly ash types F or C, slags), fibers, water reducers, air entraining agents, and rheology modifiers, for example. Other cements used in concrete include low-iron cements (white cement), and high-alumina cements (for example magnesium phosphate).

The concrete in embodiments of the method may be new, waste or recycled concrete. Recycled concrete being any concrete that has been taken out of service. Waste concrete may be excess concrete or concrete that does not meet strength or other required properties for the application and washout concrete from ready mix concrete trucks and mixers, for example.

In one embodiment, a method of producing an amorphous silica material comprises preparing a batch comprising concrete and melting the batch in a furnace to produce a melt effluent, molten glass, or molten mass. All batches described herein may be thermally processed by melting, fusing or sintering. Sintering or fusing of the components of the batch should be performed sufficiently to convert a significant amount of the crystalline silica into amorphous silica such as below toxicity levels for applications that will result in airborne dust. The method may comprise additional processing steps to prepare the melt effluent, molten glass, or molten mass (melt effluent) into a product. Therefore, the melt effluent may be subject to further processing such as, but not limited to, cooling, annealing, quenching to produce particles or an amorphous mass, air cooling, placing in a mold for a "blow and blow method" or a "press and blow method" for producing container glass, using a gob in the Westlake process, glass blowing (free, mold or modern), floating the melt effluent for flat glass, or other processing steps to produce glass products.

Embodiments of the method comprise making The method of claim 1, comprising crushing the amorphous silica particles or mass to form particles. The particles may be used as abrasives media, proppants, frits, or other applications for particles. Additionally, embodiments of the method comprise molding the melt effluent, amorphous silica particles or mass to form a glass container or other glass article. Further, embodiments of the method may comprise floating the melt effluent to form a sheet of glass, wherein the mass is the sheet of glass.

The batches may comprise additional components. For example, concrete may be mixed with other components in a batch to provide the desired properties to assist in processing and/or product properties such as, but not limited to, melting temperature, melt viscosity, process efficiency, density, toughness, hardness, or other desired properties.

The additional batch components may comprise glass cullet, glass fluxes, at least one metal oxide, at least one metal silicate, at least one metal, iron oxide, magnetite, calcium containing material, limestone, lime, silica sand, feldspar, metal slags, furnace slags, combustible materials, colorants, decolorants, fining agents, oxidizers, and reducers, for example. Calcium containing materials include, but are not limited to, furnace slag, lignite ash, coal ash, and lime residues from processing, for example.

An embodiment of the method of producing a manufactured glass article comprises preparing a batch consisting essentially of concrete. The embodiment may further comprise melting the batch in a furnace to melt effluent and cooling the melt effluent to form amorphous silica particles, mass or product. The batch may further comprise at least one of colorants, decolorants, fining agents, oxidizers, and reducers.

A further embodiment of the method of producing an amorphous silica material, comprising preparing a batch consisting essentially of concrete and glass cullet. Such an embodiment may further comprise additional steps as described herein and know in the art. A still further embodiment of the method of producing an amorphous silica material comprising preparing a batch consisting essentially of concrete, fluxes, and glass cullet.

In another embodiment, a method of producing an amorphous silica material, comprising preparing a batch consisting essentially of concrete, sand, limestone, and glass cullet.

Further additional embodiments include a method of producing an amorphous silica material comprising preparing a batch comprising concrete, iron oxide, and cullet.

A still further additional embodiment of the method of producing an amorphous silica material comprises preparing a batch consisting essentially of concrete, iron oxide, and cullet.

An embodiment of the method of producing an amorphous silica material comprises preparing a batch comprising concrete and metal slag.

Embodiments of the method may comprise preparing a batch comprising concrete and metal oxides, such as, but not limited to, iron oxide, alumina, and zirconia, for example. The concentrations of metal oxides result in the resultant amorphous silica product with a density and hardness above the density and hardness of typical recycled glass. The amorphous silica product may be substantially free of deleterious levels of toxic or heavy metals. As used herein, the term "substantially free of deleterious levels of toxic or heavy metals" means that the environmental and industrial hygiene organizations do not consider the amorphous silica product toxic if used as intended.

The methods may be used to prepare amorphous silica products. Such as the amorphous silica products described in the US Patent Application entitled "Amorphous Silica Particles and Methods of Producing Amorphous Silica Particles" filed on the same day as the application.

The density of embodiments of certain embodiments of the amorphous silica products is correlated with increasing concentrations of metal oxides including but not limited to, iron oxides, zirconium oxides, aluminum oxides, and combinations thereof, for example. Embodiments of the amorphous silicate products may have a density in the range of 2.5 g/cc to 3.5 g/cc. Embodiments with higher concentrations of iron oxide and/or other metal oxides or other density increasing components may have a density in the range of 2.8 g/cc to 3.5 g/cc.

Further, the hardness of embodiments of the amorphous silica product is correlated with increasing iron oxides, zirconium oxides, aluminum oxides, and combinations thereof. Embodiments of the amorphous silicate product have a Knoop hardness in the range of 520 Hk to 750 Hk. Embodiments with higher concentrations of the metal oxides may have a Knoop hardness in the range of 600 Hk to 750 Hk.

Metals may also be added in their pure metal form or as an alloy. The metals include, but are not limited to, iron, aluminum, titanium, zirconium, manganese, magnesium, alloys and combinations thereof. The metals may be melted in a furnace in the presence of oxygen (air) to at least partially form oxides or in a furnace with an inert atmosphere to melt directly into the amorphous silica.

The fluxes may include any fluxes typically used in glass manufacturing and may include, but are not limited to, sodium oxides, magnesium oxides, potassium oxides, lithium oxides, boric oxides, and combinations thereof, for example.

Typical particle sizes for blasting abrasives are in the range of mesh size 20/30, 30/70, and 50/100, for example. These mesh sizes may, typically, include 10% of the particles above or below the stated mesh size range.

The glass batch need only be converted to an amorphous silica, not fully melted. The cooling and crushing processes may be designed for economy, to deliver the desired properties, and to provide ease with the production of sand sized particles in the desired particle size ranges. Embodiments of the process to produce amorphous glass products may be summarized as an efficient method of producing crushed, recycled glass particles with higher density and improved hardness directly from crystalline silica materials for the same cost as recycle glass or from cullet to enhance the properties for specific applications.

Components that may be added that do not materially affect the basic and novel characteristics of the claimed invention include, but are not limited to, do not materially affect the basic and novel characteristic(s)" of the claimed invention. The secondary, additive materials may include colorants, decolorants, fining agents, oxidizers, reducers, or any other additive that does not contribute to the main oxide content of the glass.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of components, parts, techniques and steps are disclosed. Each of these has individual benefit and each can also be used in conjunction with one or more, or in some cases, all of the other disclosed embodiments and techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

DESCRIPTION

Embodiments of the method may be used to produce amorphous silica materials including, but not limited to, glass, container glass, fiber glass, glass bead, glass spheres, sheet or plate glass, glass aggregate, glass sand, abrasives, proppants, foamed glass, and manufactured glass articles. The initial processing steps include preparing a melt batch comprising concrete and, optionally, other components, melting the melt batch, and cooling the melted melt batch. Further processing steps may be utilized to produce the glass article. These finishing processing steps are known in the art and may be applied as known in the art during the cooling step or in addition to the method. Such steps are used to produce the glass, container glass, fiber glass, glass bead, glass spheres, sheet or plate glass, glass aggregate, glass sand, abrasives, proppants, foamed glass, and manufactured glass articles. Typical content of OPCC of approximately 81% $SiO_2$, 13% $CaO$, <0.7% $Fe_2O_3$, and <5% aluminum oxide makes it an effective feedstock in varying amounts for nearly all types of glass by balancing total oxide contents in the desired finished glass with supplemental oxides from separate sources of silicon dioxide, boron trioxide, aluminum oxide, magnesium oxide, zinc oxide, sodium oxide, potassium oxide, iron oxide, titanium oxide, etc. These components may be added to a glass batch alone or in combination.

Embodiments of a method of producing a manufactured glass article comprise melting concrete. Concrete is a mixture comprising Portland cement (Types I though V) or blended cement (Types IL, IS, IP, or IT), aggregate (coarse and fine), water of hydration, and, optionally, admixtures. The admixtures may include mineral (fly ash types F or C, slags), fibers, water reducers, air entraining agents, and rheology modifiers, for example. Other cements used in concrete include low-iron cements (white cement), and high-alumina cements (for example magnesium phosphate).

The concrete in embodiments of the method may be new, waste or recycled concrete. Recycled concrete being any concrete that has been taken out of service. Waste concrete may be excess concrete or concrete that does not meet strength or other required properties for the application and washout concrete from ready mix concrete trucks and mixers, for example.

In one embodiment, a method of producing an amorphous silica material comprises preparing a batch comprising concrete and melting the batch in a furnace to produce a melt effluent, molten glass, or molten mass. The method may comprise additional processing steps to prepare the melt effluent, molten glass, or molten mass (melt effluent) into a product. Therefore, the melt effluent may be subject to further processing such as, but not limited to, cooling, annealing, quenching to produce particles or an amorphous mass, air cooling, placing in a mold for a "blow and blow method" or a "press and blow method" for producing container glass, using a gob in the Westlake process, glass blowing (free, mold or modern), floating the melt effluent for flat glass, or other processing steps to produce glass products.

Embodiments of the method comprise making The method of claim 1, comprising crushing the amorphous silica particles or mass to form particles. The particles may be used as abrasives media, proppants, frits, or other applications for particles. Additionally, embodiments of the method comprise molding the melt effluent, amorphous silica particles or mass to form a glass container or other glass article. Further, embodiments of the method may comprise floating the melt effluent to form a sheet of glass, wherein the mass is the sheet of glass.

The batches may comprise additional components. For example, concrete may be mixed with other components in a batch to provide the desired properties to assist in processing and/or product properties such as, but not limited to, melting temperature, melt viscosity, process efficiency, density, toughness, hardness, or other desired properties.

The additional batch components may comprise glass cullet, glass fluxes, at least one metal oxide, at least one metal silicate, at least one metal, iron oxide, magnetite, calcium containing material, limestone, lime, silica sand, feldspar, metal slags, furnace slags, combustible materials, colorants, decolorants, fining agents, oxidizers, and reducers, for example. Calcium containing materials include, but are not limited to, furnace slag, lignite ash, coal ash, and lime residues from processing, for example.

An embodiment of the method of producing a manufactured glass article comprises preparing a batch consisting essentially of concrete. The embodiment may further comprise melting the batch in a furnace to melt effluent and cooling the melt effluent to form amorphous silica particles, mass or product. The batch may further comprise at least one of colorants, decolorants, fining agents, oxidizers, and reducers.

A further embodiment of the method of producing an amorphous silica material, comprising preparing a batch consisting essentially of concrete and glass cullet. Such an embodiment may further comprise additional steps as described herein and know in the art. A still further embodiment of the method of producing an amorphous silica material comprising preparing a batch consisting essentially of concrete, fluxes, and glass cullet.

In another embodiment, a method of producing an amorphous silica material, comprising preparing a batch consisting essentially of concrete, sand, limestone, and glass cullet.

Further additional embodiments include a method of producing an amorphous silica material comprising preparing a batch comprising concrete, iron oxide, and cullet.

A still further additional embodiment of the method of producing an amorphous silica material comprises preparing a batch consisting essentially of concrete, iron oxide, and cullet.

An embodiment of the method of producing an amorphous silica material comprises preparing a batch comprising concrete and metal slag.

The batch may be melted in a furnace to produce furnace effluent or melt effluent. Typically, the batch components will be fed into the furnace as solids and flow out as a molten liquid. The melt effluent is, typically, a liquid melted glass that flows from the furnace exit. The melt effluent may be cooled to form a solid amorphous glass by any known means. The cooling means may include, but is not limited to, water quenching, oil quenching, air cooling, annealing, cooling in a mold, cooling in a float process, and controlled air cooling. Therefore, in any embodiment, a quenching step may be replaced with any other cooling step as described herein or known in the art. The glass effluent is merely cooled to form a solid.

In one embodiment, the method comprises quenching the melt effluent to form amorphous silica particles or amorphous silica mass. The quenching may be performed by directing the furnace effluent into a water bath as known in the art.

For some applications, it may be desirable to have the amorphous silica particles or amorphous silica mass in different particle sizes. The method may further comprise crushing the amorphous silica particles to form particles of the appropriate size for the desired application by methods known in the art.

Additionally, The glass may undergo further densification process such as, but not limited to, heat treatments, cold compression, or hot compression. The densification may occur after quenching or after crushing the particles to the desired particle size range, particle size average or other distribution. Silica glasses may undergo reversible and irreversible amorphous-amorphous transitions under pressure, leading to some elastic softening upon initial compression and permanent densification under high pressure. At room temperatures (cold-compression), at pressures above 8-9 GPa, irreversible polyamorphic transition takes place and the recovered glass has an increased density. The same or even higher amount of densification can be achieved under much lower pressures (4-8 GPa) at high temperatures (hot-compression). Under hot or cold compression, the silica glass may densify up to about 25%.

Concrete

Embodiments of the method of melting concrete may be used to produce amorphous silica materials including, but not limited to, glass, container glass, fiber glass, glass bead, glass spheres, sheet or plate glass, glass aggregate, glass sand, abrasives, proppants, foamed glass, and manufactured glass articles. The initial processing steps include preparing a melt batch comprising concrete and, optionally, other components, melting the melt batch, and cooling the melted melt batch. Further processing steps may be utilized to produce the glass article. These finishing processing steps are known in the art and may be applied as known in the art during the cooling step or in addition to the method. Such steps are used to produce the glass, container glass, fiber glass, glass bead, glass spheres, sheet or plate glass, glass aggregate, glass sand, abrasives, proppants, foamed glass, and manufactured glass articles. Typical content of OPCC of approximately 81% SiO2, 13% CaO, <0.7% Fe2O3, and less than 5% aluminum oxide, makes it an effective feedstock in varying amounts for nearly all types of glass by balancing total oxide contents in the desired finished glass with supplemental oxides from separate sources of silicon dioxide, boron trioxide, aluminum oxide, magnesium oxide, zinc oxide, sodium oxide, potassium oxide, iron oxide, titanium oxide, etc. These components may be added to a glass batch alone or in combination.

Embodiments of a method of producing a manufactured glass article comprise melting a glass batch comprising concrete. Concrete is a mixture comprising Portland cement (Types I though V) or blended cement (Types IL, IS, IP, or IT), aggregate (coarse and fine), water of hydration, and, optionally, admixtures. The admixtures may include mineral (fly ash types F or C, slags), fibers, water reducers, air entraining agents, and rheology modifiers, for example. Other cements used in concrete include low-iron cements (white cement), and high-alumina cements (for example magnesium phosphate).

The concrete in embodiments of the method may be new, waste or recycled concrete. Recycled concrete being any concrete that has been taken out of service. Waste concrete may be excess concrete or concrete that does not meet strength or other required properties for the application and washout concrete from ready mix concrete trucks and mixers, for example.

In one embodiment, a method of producing an amorphous silica material comprises preparing a batch comprising concrete and melting the batch in a furnace to produce a melt effluent, molten glass, or molten mass. Embodiments of a method of producing a manufactured glass article comprise melting a glass batch consisting essentially of concrete. The methods may comprise additional processing steps to prepare the melt effluent, molten glass, or molten mass (melt effluent) into a product.

Exemplary Additional Components

The additional components may be added to glass batch in any combination.

Combustible Materials

In some embodiments, the method may comprise adding a combustible material to any of the batches described herein. The combustible material may be any combustible material that undergo combustion at a temperature below the melt temperature of the batch or the processing temperature. For example, combustible materials include organic matter, cellulosic material, plastics, paper, cloth, natural gas, oils, wood, charcoal, coke, coal, fuels, and combinations thereof.

The combustible material may be added separately or in combination with other components of the batch. For example, charcoal or coke particles or powders may be premixed in the batch with the other components or be present in one of the components of the batch. For example, recycled glass products may comprise combustible materials such as, but not limited to, paper, plastics, cardboard, oils, food residues, for example, and may, therefore, may be added to the batch with the recycled glass.

The combustible material may be added to the batch in any desired concentration range, for example, the combustible material may be in a concentration range of above 0 wt. % to 25 wt. %. The combustible material in the batch appears to act to increase the density of the amorphous silica particles. In other embodiments, the combustible material may be added to the batch in a concentration range of above 0.2 wt. % to 20 wt. %. In still further embodiments, the combustible material may be added to the batch in a concentration range of above 0.2 wt. % to 15 wt. %. In more specific embodiments, the combustible material may be added to the batch in a concentration range of above 0.5 wt. % to 8 wt. %.

The addition of the combustible material may improve the properties of the amorphous silica particles. The mechanism is not fully understood at this time, but the results have been confirmed by significant experimentation. Any of the embodiments described herein may also comprise a combustible material in the batch in any concentration capable of improving the properties of the amorphous silica production.

Limestone

Limestone and its substitutes have been shown to increase the density of some embodiments of the amorphous silica products. Limestone additions to the batch have also resulted in other improved properties of the amorphous silica particles.

The batches comprising concrete may also comprise limestone or other calcium containing materials in any concentration that provides the desired properties in the amorphous silica products. Embodiments of the batch comprise limestone in concentration of 1 wt. % to 50 wt. %. In further embodiments, the limestone may be added to the batch in a concentration of 1 wt. % to 30 wt. %. In some embodiments, the limestone may be incorporated in the batch in a concentration of 5 wt. % to 20 wt. %. Limestone may be substituted with other sources of calcium equivalent concentrations of calcium carbonate or calcium oxides as described.

Therefore, an embodiment of the method of producing an amorphous silica material may comprise preparing a batch comprising concrete and limestone and melting the batch in a furnace to melt effluent. The batch may comprise additional optional components in the ranges described herein.

A further embodiment of the method of producing an amorphous silica material comprising preparing a batch consisting essentially of concrete and melting the batch in a furnace to melt effluent.

A still further embodiment comprising limestone includes a A method of producing an amorphous silica material comprises preparing a batch consisting essentially of concrete, sand, limestone, and glass cullet. The methods may further comprise cooling the melt effluent to form amorphous silica particles, mass or product.

Cullet

Embodiments of the method may comprise preparing a glass batch comprising concrete and an amorphous silica containing material. The sources of the amorphous silica containing material include, but are not limited to, glass cullet, recycled glass, unprocessed glass waste, partially processed glass waste, diatomaceous earth, or combinations thereof, (herein "cullet").

| Typical Glass Cullet Composition | |
| --- | --- |
| SiO2 | 74. wt. % |
| MgO | 0.3 wt. % |
| CaO | 11.3 wt. % |
| NaO | 13 wt. % |
| K2O | 0.2 wt. % |
| Al2O3 | 0.7 wt. % |
| Fe2O3 | 0.01 wt. % |

An embodiment of the method of producing an amorphous silica material comprises preparing a batch consisting essentially of concrete and glass cullet. The cullet adds amorphous silica and fluxes, among other components, to the batch. The batch may comprise additional optional components in the ranges described herein.

A further embodiment of the method of producing an amorphous silica material comprising preparing a batch consisting essentially of concrete and glass cullet. A batch comprising concrete and cullet will melt at a lower temperature of a batch consisting essentially of concrete. To further reduce at least one of the melting temperature or the melt effluent viscosity, fluxes may be added to the batch. Therefore, another embodiment of the method of producing an amorphous silica material comprises preparing a batch consisting essentially of concrete, fluxes, and glass cullet.

Density increasing components may be added to the batch also. As such, an embodiment of the invention comprises a method of producing an amorphous silica material comprises preparing a batch comprising concrete, iron oxide, and cullet. The batch may comprise additional components as described herein or the batch may consist essentially of concrete, iron oxide, and cullet.

The batches comprising concrete may also comprise cullet in any concentration that provides the desired properties in the amorphous silica products. Embodiments of the batch comprise cullet in concentration of 1 wt. % to 80 wt. %. In further embodiments, the cullet may be added to the batch in a concentration of 1 wt. % to 50 wt. %; or in concentration range from 10 wt. % to 50 wt. %. In some embodiments, the cullet may be incorporated in the batch in a concentration of 1 wt. % to 25 wt. %. In other embodiments, the batch may be primarily cullet and the cullet may be added in a concentration range from 50 wt. % to 95 wt. %.

Flux

The melting point reducing agents may include, but is not limited to, sodium carbonate, sodium nitrate, iron oxide, iron silicates, potash, potassium carbonate, calcium carbonate, colemanite, sodium oxide, calcium oxide, magnesia, alumina, aluminum oxides, alumina silicates, lead oxide, alkali metals, lithium, sodium, potassium, rubidium, cesium, francium, and combinations thereof.

Additional fluxes may include materials such as naturally occurring products that contain these reducing agents such as, but not limited to, feldspar, alumina silicates comprising iron, bauxite, clays, ball clays, Kentucky or Tennessee clay, and kaolin, for example. Clay may be a finely-grained natural rock or soil material that combines one or more clay minerals with possible traces of quartz (SiO2), metal oxides (Al2O3, MgO etc.) and organic matter. Ball clays are typically kaolinitic sedimentary clays that commonly consist of 20-80% kaolinite, 10-25% mica, 6-65% quartz. Another flux may be bauxite. Sodium carbonate increases the viscosity of the glass melt at a given temperature but is relatively expensive.

The batches comprising concrete may also comprise at least one flux in any concentration that provides the desired properties in the amorphous silica products and/or in the processing steps. Embodiments of the batch comprise flux in concentration of 1 wt. % to 30 wt. %. In further embodiments, the flux may be added to the batch in a concentration of 5 wt. % to 20 wt. %.

Density, Hardness and Other Property Enhancing Components

Embodiment of the glass batches may comprise at least one of metals, metal silicates, or metal oxides. These metals, metal silicates, and metal oxides include refractory metals, iron, aluminum, titanium, vanadium, chromium, manganese, zirconium, zircon, niobium, molybdenum, ruthenium, rhodium, hafnium, tantalum, tungsten, rhenium, osmium, iridium, and oxides or silicates of these metals, for example.

The alumina may be from clay and, in some embodiments, low alkali clay. Some clays are up to 10% alumina. Alkalis and lead oxides may decrease hardness in the resultant amorphous product, whereas addition of CaO, MgO, ZnO, Al2O3, B2O3, zirconium, zircon, zirconium oxides, iron and iron oxides may result in amorphous silica products with greater hardness.

A readily available metal oxide is iron oxide. It has been found that magnetite results in a measurable increase in density of the resultant amorphous silica product. As such, a batch comprising concrete may further comprise at least one of at least one of a metal oxide, a metal silicate, and a metal. The metal oxide, a metal silicate, and a metal may comprise iron oxide or consist essentially of iron oxide. The iron oxide in any embodiment may be magnetite. Additionally, iron ores may be added to the batch as a source of iron compounds to produce the amorphous silica products.

The batches comprising concrete may also comprise iron oxide in any concentration that provides the desired properties in the amorphous silica products. Embodiments of the batch comprise iron oxides in concentration of 1 wt. % to 40 wt. %. In further embodiments, the iron oxides may be added to the batch in a concentration of 10 wt. % to 40 wt. %; or in concentration range from 20 wt. % to 40 wt. %.

Embodiments of the batch after melting and cooling may produce amorphous silica particles have a density greater than 2.65 g/ml and 3.6 g/ml and in some embodiments, a density greater than 2.80 g/ml and less than 4.0 g/ml. The amorphous silica particles produced after melting and cooling may have a density greater than 3.0 g/ml and less than 4.0 g/ml.

Sand

Embodiments of the method may comprise the addition of crystalline silica compounds to the batch. The most common source of crystalline silica is silica sand. Though other minerals clays comprise crystalline silica and may be added.

The crystalline silica addition can increase the silica oxide concentration in the resultant amorphous silica products. Concrete may add a certain amount of silica but this may be supplemented with silica sand.

The batches comprising concrete may also comprise silica sand or a source of crystalline silica in any concentration that provides the desired properties in the amorphous silica products. Embodiments of the batch comprise silica sand or a source of crystalline silica in concentration of 1 wt. % to 30 wt. %. In further embodiments, the silica sand or a source of crystalline silica may be added to the batch in a concentration of 5 wt. % to 20 wt. %; or in concentration range from 20 wt. % to 40 wt. %.

Mineral Slags

Mineral slags comprise silica compounds and other metal oxides and, therefore, they may be used in embodiments of the methods. Such slags may comprise components above acceptable limits by industrial hygiene organizations. In embodiments of the invention, glass cullet, sand, and/or additional oxides such as, iron oxide, aluminum oxide, titanium oxide and zirconium oxide, for example, may be added to the batch comprising concrete to produce an amorphous silica product having the potentially toxic components below the acceptable limits. Mineral slag including, but not limited to, iron slag, nickel slag, copper slag, platinum slag, and coal slag, may also be blended into a batch to produce an amorphous silica product. The mineral slags may be combined with any of the components as described herein including, but not limited to, silica sand, glass cullet, recycled Portland concrete, iron ore or iron oxides, limestone, combustible materials, fluxes, and/or the substitutes for these materials as described herein.

The batches comprising concrete may also comprise silica sand or a source of crystalline silica in any concentration that provides the desired properties in the amorphous silica products. Embodiments of the batch comprise silica sand or a source of crystalline silica in concentration of 1 wt. % to 30 wt. %. In further embodiments, the silica sand or a source of crystalline silica may be added to the batch in a concentration of 5 wt. % to 20 wt. %; or in concentration range from 20 wt. % to 40 wt. %.

Preparing the Glass Batch, Batch, or Melt Composition

Embodiments of the method comprise preparing a glass batch. The glass batches are based upon concrete such as, but not limited to, recycled Portland cement concrete. The concrete may be melted alone or with any of the components or combinations of these components.

Recycled Portland Cement Concrete

In one embodiment, the glass batch may comprise or consist essentially of recycled Portland cement concrete. The glass batch may comprise 40 wt. % to 70 wt. % recycled Portland cement concrete, 30 wt. % to 35 wt. % iron oxide, preferably magnetite, 0 wt % to 10 wt. % limestone, and 0% to 5% combustible material, preferably charcoal.

Combinations of Recycled Portland Cement Concrete and Amorphous Silica and Crystalline Silica In some embodiments, the glass batch may be a combination of recycled Portland cement concrete, silica sand, or recycled glass cullet. The glass batch may comprise cement concrete, 5 wt. % to 10 wt. % recycled glass cullet or 5 wt. % to 10 wt. % silica sand, 30 wt. % to 35 wt. % iron oxide, or more preferably magnetite, and 0 wt. % to 5 wt. % combustible material, preferably charcoal.

Combinations of Recycled Portland Cement Concrete and Mineral Slag

In some embodiments, the glass batch may be a combination of recycled Portland cement concrete and mineral slag. The glass batch may comprise 1 wt. % to 70 wt. % recycled Portland cement concrete, 1 wt. % to 70 wt. % mineral slag (coal slag, copper slag, nickel slag, iron slag, or similar), and 0 wt. % to 40 wt. % iron oxide, preferably magnetite, and 0 wt. % to 5 wt % combustible material, preferably charcoal.

By processing the glass batches in either glass manufacturing methods or frit manufacturing methods, amorphous glass products will be produced. The amorphous glass may be used for any purpose including, but not limited to, abrasive blasting media, proppants, high density amorphous glass product, and other products.

Heating the Glass Batch to Produce Amorphous Silica Products

Embodiments of the method comprise converting crystalline silica into an amorphous silica produce amorphous silica sand, gravel, or other particles, sheets, or fibers. The method may comprise heating the glass batch comprising crystalline silica in the concrete, for example, to a temperature above the temperature that results in the phase change from the crystalline silica to an amorphous form of silica. The furnace may increase the temperature of the glass batch above the melting temperature of crystalline silica. The melting point of pure silica dioxide is 3110° F. (1710° C.) but may be lowered by addition of fluxes as described above.

Embodiments of the heating the glass batch comprise feeding the glass batch into a glass melting furnace. The furnace may be a continuous or batch furnace. There are various types of glass melting furnaces including pot furnaces (for batch processing), day tank furnaces, gas fired furnaces, and electric furnaces.

In an embodiment comprising a continuous furnace, the glass batch may be heated to and become molten at approximately 1100° C. to 1700° C., more specifically a temperature range 1250° C. to 1600° C., depending upon the composition of the glass batch. In some embodiments of the method, the glass batch may be heated to or above the melt temperature of the glass batch. In another embodiment, the glass batch may be heated to a temperature between the melt temperature and the temperature in which the crystalline silica converts to amorphous silica. As previously described, the melt temperature and the temperature at which the crystalline silica converts to amorphous silica will depend on the composition of the glass batch. In such embodiments, the glass batch may be heated to a temperature below the gob temperature. In certain batch embodiments, the glass batch may be heated to similar temperatures. In certain embodiments, the process does not comprise refining the molten glass batch to remove all gas bubbles. This process is necessary to produce clear glass containers or plate glass but may not be necessary to produce amorphous silica sand, gravel, and other particles, sheets, or fibers.

The melt effluent of the furnace may be a ribbon of molten amorphous silica.

Cooling the Furnace Effluent

Embodiments of the method of the invention comprise cooling the ribbon effluent from the furnace. Therefore, a method may comprise cooling or allowing the amorphous mass cool to a hardened state. In some embodiments, the process may comprise rapidly cooling or quenching the ribbon of furnace effluent such as by fritting. Fritting of the molten glass causes a thermal gradient and violent fracturing of the solidifying amorphous material. The quenching of the molten glass may be performed by contact with a fluid such as water. The molten glass ribbon may overflow the furnace into a bath of fluid or the fluid may be spraying of the molten glass.

The solidified solid is an amorphous silica product. The fracturing of the glass results in small particles that may be classified into particle size ranges. The various particle size ranges may find application in the products described herein.

Embodiments of the method may further comprise crushing or otherwise comminuting at least a portion of the amorphous silica to particles to a smaller size or to narrow the particle size distribution. The desired particle size distribution may be the appropriate particle size distribution for abrasive blasting, use in mortar, plaster, concrete, and asphalt paving, foundry sand, and/or the production of bricks, for example.

Optionally, an embodiment of the process may comprise annealing fractured amorphous silica particle or the crushed or otherwise comminuted amorphous mass.

The molten glass batch exits the refractory through a weir. The weir is designed to provide an evenly shaped flow of molten glass for quenching. The furnace may have more than one weir to ensure proper molten glass ribbon shape and size for efficient quenching and fracturing of the solidifying amorphous silica.

In certain embodiments, quenching the molten amorphous mass should be performed properly to ensure fracturing of the amorphous solid upon rapid cooling. Ideally, the quenched amorphous solid comprises a particulate product having a desired particle size range, average particle size, and/or particle size distribution. The furnace effluent flow rate and shape may be controlled to provide uniform quenching of the amorphous silica.

Applications and Products

An embodiment of a process consists essentially of transforming concrete into amorphous silica melt effluent, sand, gravel or other particles for the purpose of rendering the material substantially free of crystalline silica making it a safe replacement for naturally occurring products containing various forms of crystalline silica in consumer and industrial applications through a process comprising heating the crystalline or polycrystalline sand, grains, particles or rock into an amorphous mass and reducing the size of the amorphous mass for use in the desired application.

Still further embodiments of the process may comprise using amorphous sand for applications that currently of previously used crystalline or polycrystalline sand products including, but not limited to silica sand product applications and crushed rock products.

The amorphous sand, products, and articles produced by this process are especially useful for processes that produce airborne dusts and products such as for abrasive blasting or products that will be cut such as cement blocks, pavers, or bricks to avoid producing a potentially dangerous dust if crystalline silica sand was used, or are useful in recycling, repurposing, or otherwise transforming materials that might otherwise be destined to landfills into products of value.

Products and applications for the amorphous silica particles include but are not limited to, crystalline silica free amorphous silica sand, crystalline silica free amorphous silica gravel, crystalline silica free amorphous cullet or feedstock, amorphous silica blasting material, crystalline silica free concrete, grout, manufactured stone, pavers, or mortar, concrete blocks made from crystalline silica free concrete, crystalline silica free bricks comprising crystalline free amorphous silica, crystalline silica free glass sheets, containers, and crystalline silica free glass fibers. For example, the bricks may comprise crystalline silica free sand in a concentration from 50% to 60% by weight, alumina in a concentration from 20% to 30% by weight, and lime in a concentration from 2 to 5% by weight.

As such, an embodiment of the amorphous silica product comprises amorphous silicon oxide in the range of 50 wt. % to 75 wt. %, a combination of iron oxides and aluminum oxides, wherein the iron oxides and the aluminum oxides together are in in the range of 15 wt. % to 50 wt. %, wherein the aluminum oxides are in a range of 0.5 wt. % to 10 wt. %, and fluxing compounds in the range of 0 to 10 wt. %. In a more specific embodiment, the aluminum oxides may be in the range of 3 to 10 wt. %.

Similarly, an embodiment of the amorphous silica product comprises amorphous silicon oxide in the range of 50 wt. % to 75 wt. %, a combination of iron oxides and zirconium oxides, wherein the iron oxides and the zirconium oxides together are in in the range of 12 wt. % to 50 wt. %, wherein the zirconium oxides are in a range of 0.5 wt. % to 10 wt. %, and fluxing compounds in the range of 0 to 10 wt. %. In a more specific embodiment, the aluminum oxides may be in the range of 0.5 wt. % to 5 wt. %. In either of the above embodiments, the zirconium oxides or the aluminum oxides may be substituted with a combination of aluminum oxides and zirconium oxides.

Other embodiments of the amorphous silica product comprises unusually low levels of silicon in the form of amorphous silicon oxide in the range of 13 wt. % to 25 wt %, iron oxides in the range of 0% wt. % to 40 wt. %, Aluminum oxides in the range of 0 wt. % to 12 wt. %, magnesium oxides in the range of 0 wt. % to 3 wt. %, calcium oxides in the range of 8 wt. % to 25 wt %, alkali metals in the range of 0 wt. % to 1 wt. %, and carbon in the range of 0 wt. % to 10 wt. %. Such products exhibit excellent levels of density, often above 3.0 g/cm3, and favorable hardness for their applications, often in a range of 500 to 640 Knoop Hardness.

Further, an embodiment of the amorphous silica product consists essentially of amorphous silicon oxide in the range of 10 wt. % to 60 wt. %, a combination of iron oxides and calcium oxides, wherein the iron oxides and the calcium oxides together are in in the range of 15 wt. % to 85 wt. %, and fluxing compounds in the range of 0 to 20 wt. %. In another such embodiments, the iron oxides may be in a concentration range of 10 wt. % to 60 wt. %. In another embodiment, the iron oxides may be in a concentration range of 20 wt. % to 50 wt. % and the calcium oxides may be in a concentration range of 10 wt. % to 45 wt. %. In a further embodiment, the iron oxides may be in a concentration range of 20 wt. % to 40 wt. % and the calcium oxides may be in a range of 20 wt. % to 40 wt. %. The amorphous silica of the invention may be used as water insoluble or water soluble sand and blasting media. In a more specific embodiment, the iron oxides may be in the range of 25 to 40 wt. %.

Unlike recycled glass products, the amorphous silica sand produced by the method of the invention will comprise no non-glass residues (trash or contaminants) such as trace fecal matter, trace ferrous items or matter (unless intentionally added), trace nonferrous items or metals, trace stone or ceramic items or matter, and/or trace pathogens. These substances are found in all recycled glass cullet products.

[1.] Another embodiment of the method of the present invention to directly create a glass cullet that is free from contaminants. Glass production facilities add crushed recycled glass cullet into the new glass production process to reduce the heat required to melt the silica sand and the melt temperature of the silica sand. The problem with this glass cullet is that it may include contaminants from the glass recycle process. An embodiment of the method of the present invention is to produce clean glass cullet directly from concrete. This "pre-reacted" batch material that can be added to batch glass (much as glass cullet is used today) that will lower the melt temperature of batch glass.

[2]. The amorphous silica sand, gravel, products, articles or other particles may be used in the manufacture of many products. For example, crystalline free silica foam glass and ceramics may be produced. An embodiment of the method for production of crystalline free foamed glass may comprise blending fine amorphous silica sand or ground amorphous silica sand with a blowing agent to form a foam glass precursor. The blowing agent may be any compound that produces an off-gas during heating at furnace temperatures. The blowing agent may be, but is not limited to, carbon or limestone, for example.

[3]. The method may further comprise heating the foam glass precursor in the furnace to cause the blowing agents to out-gas, thus expanding or foaming the molten mass. The molten mass is cooled and annealed to freeze the gas pockets creating a lightweight product. Foamed glass in the melted state can be formed into many products including insulation, blocks, brick, or aggregate for construction or agriculture.

[4]. The new "virgin" amorphous silica glass cullet product would compete directly with recycled glass cullet. The advantage of the embodied "pre-reacted" batch material would be it would be 100% free of deleterious materials such as rock, ceramic, metals, or lead that cullet producers go to a lot of work to ensure don't get into their cullet in excessive quantities.

[5]. As used herein, the term "no trace" means that the component is below measurement limits of instruments typically used to determine the concentration of the component.

[6]. As used herein, "amorphous silica sand" means a silica product comprising less than 2 wt. % of crystalline silica in a primarily amorphous silica product, in a more specific embodiment, "amorphous silica sand" means a silica product comprising less than 1 wt. % of crystalline silica in a primarily amorphous silica product; and in an even more specific embodiment for blasting products, for example, "amorphous silica sand" means a silica product comprising less than 0.5 wt. % of crystalline silica in a primarily amorphous silica product.

EXAMPLES

[7]. Cullet was obtained from a glass recycling facility. The composition of the cullet was approximately as follows:

[8]. In embodiments of the glass formulations, the silicon oxides may be added in the form of cullet, sand, other sources of silicon oxides, or combinations thereof.

[9]. The melts were performed in a [Make and Model of Furnace] CF1700 muffle furnace manufactured by Across International.

Example 1

[10]. A melt batch (Sample 2789) was prepared comprising the following composition, silica dioxide (SiO2) at 85 wt. %, sodium oxide (NaO) at 14 wt. %, and iron oxide (Fe2O3) at 1 wt. % in the melt batch.

[11]. The melt batch was melted in a crucible in a batch furnace at approximately 1525° C. The melted batch was then quenched in water. The solidified glass was sent for analysis for specific gravity and hardness. The specific gravity was determined to be 2.25. The Knoop hardness was determined to be 481.8.

Example 2

[12]. A melt batch (Sample 2790) was prepared comprising the following composition, silica dioxide (SiO2) at 84 wt. %, zirconium oxide (ZrO) at 13 wt. %, sodium oxide (NaO) at 1 wt. %, and iron oxide (Fe2O3) at 2 wt. % in the melt batch.

[13]. The melt batch was melted in a crucible in a batch furnace at approximately 1550° C. The melted batch was then quenched in water. The solidified glass was sent for analysis for specific gravity and hardness. The specific gravity was determined to be 2.36. The Knoop hardness was determined to be 493.7.

Example 3

[14]. A melt batch (Sample 2791) was prepared comprising the following composition, silica dioxide (SiO2) at 83 wt. %, zirconium oxide (ZrO) at 2 wt. %, sodium oxide (NaO) at 10 wt. %, and iron oxide (Fe2O3) at 5 wt. % in the melt batch.

[15]. The melt batch was melted in a crucible in a batch furnace at approximately 1575° C. The melted batch was then quenched in water. The solidified glass was sent for analysis for specific gravity and hardness. The specific gravity was determined to be 2.35. The Knoop hardness was determined to be 540.6.

Example 4

[16]. A melt batch (Sample 2792) was prepared comprising the following composition, silica dioxide (SiO2) at 80 wt. %, zirconium oxide (ZrO) at 5 wt. %, sodium oxide (NaO) at 5 wt. %, and iron oxide (Fe2O3) at 10 wt. % in the melt batch.

[17]. The melt batch was melted in a crucible in a batch furnace at approximately 1625° C. The melted batch was then quenched in water. The solidified glass was sent for analysis for specific gravity and hardness. The specific gravity was determined to be 2.86. The Knoop hardness was determined to be 638.4.

Example 5

[18]. A melt batch (Sample 2799) was prepared comprising the following composition, silica dioxide (SiO2) at 70 wt. %, zirconium oxide (ZrO) at 2 wt. %, sodium oxide (NaO) at 5 wt. %, aluminum oxide (Al2O3) at 3 wt. %, and iron oxide (Fe2O3) at 20 wt. % in the melt batch.

[19]. The melt batch was melted in a crucible in a batch furnace at approximately 1600 to 1625° C. The melted batch was then quenched in water. The solidified glass was sent for analysis for specific gravity and hardness. The specific gravity was determined to be 2.5. The Knoop hardness was determined to be 615.4.

Example 6

[20]. A melt batch (Sample 2800) was prepared comprising the following composition, silica dioxide (SiO2) at 65 wt. %, zirconium oxide (ZrO) at 2 wt. %, sodium oxide (NaO) at 4 wt. %, aluminum oxide (Al2O3) at 6 wt. %, and iron oxide (Fe2O3) at 23 wt. % in the melt batch.

[21]. The melt batch was melted in a crucible in a batch furnace at approximately 1600 to 1625° C. The melted batch was then quenched in water. The solidified glass was sent for analysis for specific gravity and hardness. The specific gravity was determined to be 2.69. The Knoop hardness was determined to be 668.7.

Example 7: Melt Batch from Sand

[22]. A melt batch (Sample 2801) was prepared comprising the following composition, silica dioxide (SiO2) at 60 wt. %, zirconium oxide (ZrO) at 2 wt. %, sodium oxide (NaO) at 3 wt. %, aluminum oxide (Al2O3) at 8 wt. %, and iron oxide (Fe2O3) at 27 wt. % in the melt batch.

[23]. The melt batch was melted in a crucible in a batch furnace at approximately 1600 to 1625° C. The melted batch was then quenched in water. The solidified glass was sent for analysis for specific gravity and hardness. The specific gravity was determined to be 2.52. The Knoop hardness was determined to be 721.9.

Example 8: Melt Batch from Cullet

[24]. A melt batch (Sample 2802) was prepared comprising the following composition, cullet (approximate composition above) at 90 wt. %, zirconium oxide (ZrO) at 2 wt. %, aluminum oxide (Al2O3) at 3 wt. %, and iron oxide (Fe2O3) at 5 wt. % in the melt batch.

[25]. The melt batch was melted in a crucible in a batch furnace at approximately 1600 to 1625° C. The melted batch was then quenched in water. The solidified glass was sent for analysis for specific gravity and hardness. The specific gravity was determined to be 2.50. The Knoop hardness was determined to be 622.

Example 9: Melt Batch from Cullet

[26]. A melt batch (Sample 2803) was prepared comprising the following composition, cullet (approximate composition above) at 80 wt. %, zirconium oxide (ZrO) at 3 wt. %, aluminum oxide (Al2O3) at 4.5 wt. %, and iron oxide (Fe2O3) at 12.5 wt. % in the melt batch.

[27]. The melt batch was melted in a crucible in a batch furnace at approximately 1600 to 1625° C. The melted batch was then quenched in water. The solidified glass was sent for analysis for specific gravity and hardness. The specific gravity was determined to be 2.54. The Knoop hardness was determined to be 651.9.

Example 10: Melt Batch from Cullet

[28]. A melt batch (Sample 2804) was prepared comprising the following composition, cullet (approximate composition above) at 70 wt. %, zirconium oxide (ZrO) at 4 wt. %, aluminum oxide (Al2O3) at 6 wt. %, and iron oxide (Fe2O3) at 20 wt. % in the melt batch.

[29]. The melt batch was melted in a crucible in a batch furnace at approximately 1600 to 1625° C. The melted batch was then quenched in water. The solidified glass was sent for analysis for specific gravity and hardness. The specific gravity was determined to be 2.71. The Knoop hardness was determined to be 654.8.

Example 11: Melt Batch from Sand

[30]. A melt batch (Sample 2809) was prepared comprising the following composition, silica dioxide (SiO2) at 62.45 wt. %, magnesium oxide (MgO) at 0.3 wt. %, calcium oxide (CaO) at 0.2 wt. %, sodium oxide (NaO) at 7 wt. %, potassium oxide (KO) at 0.05 wt. %, and iron oxide (Fe2O3) at 30 wt. % in the melt batch.

[31]. The melt batch was melted in a crucible in a batch furnace at approximately YYYY° C. A portion of the melted batch was then quenched in water (Sample XXXXQ) and a portion of the melted batch was air cooled (Sample 2809A).

[32]. The solidified glass was sent for analysis for specific gravity and hardness. The specific gravity for Sample 2809Q was determined to be 2.534 and its Knoop hardness was determined to be 552.1.

[33]. The specific gravity for Sample 2809A was determined to be 2.864 and its Knoop hardness was determined to be 570.6.

Example 12: Melt Batch from Sand

[34]. A melt batch (Sample 2810) was prepared comprising the following composition, silica dioxide (SiO2) at 57.45 wt. %, magnesium oxide (MgO) at 0.3 wt. %, calcium oxide (CaO) at 0.2 wt. %, sodium oxide (NaO) at 6.14 wt. %, potassium oxide (KO) at 0.05 wt. %, and iron oxide (Fe2O3) at 35 wt. % in the melt batch.

[35]. The melt batch was melted in a crucible in a batch furnace at approximately YYYY° C. A portion of the melted batch was then quenched in water (Sample 28100) and a portion of the melted batch was air cooled (Sample 2810A).

[36]. The solidified glass was sent for analysis for specific gravity and hardness. The specific gravity for Sample 28100 was determined to be 2.858 and its Knoop hardness was determined to be 580.8.

[37]. The specific gravity for Sample 2810A was determined to be 2.826 and its Knoop hardness was determined to be 586.4.

Example 12

[38]. A melt batch may be prepared comprising the following composition, silica dioxide (SiO2) at 42.3 wt. %, magnesium oxide (MgO) at 0.3 wt. %, calcium oxide (CaO) at 0.2 wt. %, sodium oxide (NaO) at 6.14 wt. %, wt. %, and iron oxide (Fe2O3) at 50 wt. % in the melt batch.

Further Examples

[39]. Additional amorphous silica products were produced from batches as described in the tables below. The examples exemplify the methods used to produce the amorphous silica products from crystalline silica, amorphous silica and combinations of amorphous and crystalline silica.

[40]. The examples demonstrate the use of iron oxides and/or limestone can cheaply increase the density of these products over the silica sand and cullet.

| Primary Network Former: Cullet Crucible: Alumina or Graphite | | | | | | | | | | | | | |
|---|---|---|---|---|---|---|---|---|---|---|---|---|---|
| Melt # | Specific Gravity | Knoop Hardness | Temp. ° C. | Crucible | Cullet | Iron (III) Oxide Fe2O3 | Magnetite | Iron Ore (Taconite) | Calcium Carbonate | Limestone | Sodium Carbonate | Potassium Carbonate | Charcoal |
| 108 | 2.67 | | 1200 | Alumina | 65.00% | | 30.00% | | | 0.00% | 5.00% | 0.00% | 0.00% |
| 109 | 2.70 | | 1200 | Alumina | 68.00% | | 32.00% | | | 0.00% | 0.00% | 0.00% | 0.00% |
| 111 | 2.77 | 539.4 | 1200 | Alumina | 65.00% | | 30.00% | | | 3.00% | 0.00% | 0.00% | 2.00% |
| 112 | 2.80 | 554.1 | 1290 | Alumina | 65.00% | | 30.00% | | 0.00% | 5.00% | 0.00% | 0.00% | |
| 41 | 2.74 | 589.8 | 1290 | Alumina | 65.00% | | 30.00% | | 0.00% | 0.00% | 5.00% | 0.00% | |
| 41 | 2.68 | | 1200 | Alumina | 65.00% | | 30.00% | | 0.00% | 0.00% | 5.00% | 0.00% | |
| 41 | 2.69 | | 1290 | Alumina | 65.00% | | 30.00% | | 0.00% | 0.00% | 5.00% | 0.00% | |
| 43 | 2.70 | | 1280 | Alumina | 66.67% | | 28.57% | | 0.00% | 0.00% | 4.76% | 0.00% | |
| 45 | 2.78 | | 1290 | Alumina | 46.00% | | 30.00% | | 0.00% | 12.00% | 12.00% | 0.00% | |
| 47 | 2.77 | | 1290 | Alumina | 26.00% | | 29.00% | | 0.00% | 36.40% | 8.60% | 0.00% | |
| 51 | 2.72 | | 1290 | Alumina | 30.00% | | 30.00% | | 30.00% | 0.00% | 0.00% | 10.00% | |
| 94 | 2.72 | | 1290 | Alumina | 68.00% | | 32.00% | | 0.00% | 0.00% | 0.00% | 0.00% | |
| 110 | 2.70 | | 1200 | Alumina | 65.00% | 0.00% | 30.00% | | | 3.00% | | | 2.00% |
| 95 | 2.78 | | 1380 | Alumina | 63.00% | 0.00% | 32.00% | | | 0.00% | | | 5.00% |
| 96 | 2.67 | | 1290 | Alumina | 63.00% | 32.00% | 0.00% | | | 0.00% | | | 5.00% |
| 103 | 2.78 | | 1290 | Alumina | 63.00% | 0.00% | 32.00% | | | 0.00% | | | 5.00% |
| 104 | 2.81 | 530.8 | 1290 | Alumina | 63.00% | 0.00% | 32.00% | | | 3.00% | | | 2.00% |
| 113 | 2.81 | | 1390 | Alumina | 63.00% | 0.00% | 31.00% | | | 4.00% | | | 2.00% |
| 114 | 3.01 | | 1390 | Alumina | 65.00% | 0.00% | 30.00% | | | 3.00% | | | 2.00% |
| 85 | 2.64 | | 1380 | Alumina | 20.08% | 35.66% | 0.00% | | | 36.43% | 0.00% | 7.83% | 0.00% |
| 91 | 3.24 | | 1390 | Alumina | 18.78% | 0.00% | 33.35% | | | 34.07% | 0.00% | 7.32% | 6.48% |
| 99 | 2.69 | | 1480 | Alumina | 23.64% | 0.00% | 26.36% | | | 33.09% | 7.82% | 0.00% | 9.09% |
| 105 | 3.18 | 473.2 | 1390 | Alumina | 24.64% | 0.00% | 30.45% | | | 33.09% | 7.82% | 0.00% | 4.00% |
| 42 | 2.73 | | 1380 | Alumina | 49.00% | | | 33.00% | | 6.00% | 0.00% | 12.00% | 0.00% |
| 22 | 3.07 | 646.2 | 1380 | Alumina | 18.78% | | | 33.35% | | 34.07% | 0.00% | 7.32% | 6.48% |
| 23 | 3.02 | | 1380 | Alumina | 25.00% | | | 50.00% | | 13.00% | 0.00% | 12.00% | 0.00% |
| 31 | 2.95 | 533.1 | 1430 | Alumina | 27.92% | | | 26.34% | | 37.65% | 0.00% | 8.09% | 0.00% |
| 32 | 2.97 | 567.3 | 1380 | Alumina | 27.97% | | | 26.27% | | 37.66% | 0.00% | 8.09% | 0.00% |
| 33 | 2.93 | | 1380 | Alumina | 26.00% | | | 29.00% | | 36.43% | 0.00% | 8.57% | 0.00% |
| 34 | 2.89 | | 1380 | Alumina | 22.37% | | | 29.01% | | 34.61% | 0.00% | 7.43% | 6.58% |
| 35 | 2.87 | | 1380 | Alumina | 43.00% | | | 26.00% | | 19.00% | 12.00% | 0.00% | 0.00% |
| 36 | 2.87 | 576.8 | 1380 | Alumina | 55.00% | | | 40.00% | | 0.00% | 0.00% | 5.00% | 0.00% |
| 37 | 2.85 | | 1290 | Alumina | 25.40% | | | 30.30% | | 34.30% | 0.00% | 10.00% | 0.00% |
| 38 | 2.83 | | 1380 | Alumina | 43.00% | | | 26.00% | | 19.00% | 0.00% | 12.00% | 0.00% |
| 39 | 2.79 | | 1380 | Alumina | 45.00% | | | 30.00% | | 13.00% | 0.00% | 12.00% | 0.00% |
| 40 | 2.76 | | 1380 | Alumina | 50.00% | | | 38.00% | | 0.00% | 0.00% | 12.00% | 0.00% |
| 1 | 2.54 | | 1409 | Graphite | 60.00% | 40.00% | 0.00% | | | | | | |
| 2 | 2.44 | | 1450 | Graphite | 70.00% | 30.00% | 0.00% | | | | | | |
| 3 | 2.32 | | 1450 | Graphite | 80.00% | 20.00% | 0.00% | | | | | | |
| 4 | 2.45 | | 1450 | Graphite | 90.00% | 10.00% | 0.00% | | | | | | |
| 20 | 3.13 | | 1380 | Graphite | 26.05% | 0.00% | 24.58% | | | 35.14% | 0.00% | 7.55% | 6.68% |
| 21 | 3.13 | | 1380 | Graphite | 27.92% | 0.00% | 26.34% | | | 37.65% | 0.00% | 8.09% | 0.00% |

| Primary Network Former: Silica Sand Crucible: Alumina | | | | | | | | | | | |
|---|---|---|---|---|---|---|---|---|---|---|---|
| Melt # | Specific Gravity | Knoop Hardness | Temp. ° C. | Crucible | Sand | Iron (III) Oxide Fe2O3 | Magnetite | Limestone | Sodium Carbonate | Potassium Carbonate | Charcoal |
| 86 | 2.67 | | 1480 | Alumina | 14.57% | 34.52% | 0.00% | 33.31% | 4.43% | 7.16% | 6.02% |
| 87 | 3.10 | | 1480 | Alumina | 14.57% | 34.52% | 0.00% | 33.31% | 4.43% | 7.16% | 6.02% |
| 88 | 3.16 | | 1480 | Alumina | 14.57% | 0.00% | 34.52% | 33.31% | 4.43% | 7.16% | 6.02% |
| 89 | 3.23 | 585.5 | 1390 | Alumina | 14.57% | 0.00% | 34.52% | 33.31% | 4.43% | 7.16% | 6.02% |
| 100 | 3.23 | | 1390 | Alumina | 15.50% | 0.00% | 36.74% | 35.44% | 4.71% | 7.61% | 0.00% |
| 106 | 3.08 | | 1390 | Alumina | 15.50% | 0.00% | 36.73% | 35.45% | 4.72% | 7.61% | 0.00% |
| 90 | 3.35 | 617.6 | 1390 | Alumina | 10.20% | 4.37% | 34.52% | 33.31% | 4.43% | 7.16% | 6.02% |
| 93 | 3.32 | | 1390 | Alumina | 10.20% | 4.37% | 34.52% | 33.31% | 4.43% | 7.16% | 6.02% |

Primary Network Former: Silica Sand or Cullet, and Mineral Slag
Crucible: Alumina

| Melt # | Specific Gravity | Knoop Hardness | Temp. °C. | Crucible | Sand | Cullet | Coal Slag | Nickel Slag | Magnetite | Magnesium Oxide | Calcium Carbonate | Limestone |
|---|---|---|---|---|---|---|---|---|---|---|---|---|
| 58 | 2.82 | | 1390 | Alumina | | 20.00% | 0.00% | 60.00% | 15.00% | 0.00% | 5.00% | 0.00% |
| 62 | 2.63 | | 1480 | Alumina | | 40.00% | 50.00% | 0.00% | 5.00% | 0.00% | 5.00% | 0.00% |
| 64 | 2.87 | | 1480 | Alumina | | 10.00% | 0.00% | 50.00% | 30.00% | 0.00% | 10.00% | 0.00% |
| 65 | 2.54 | | 1480 | Alumina | | 20.00% | 50.00% | 0.00% | 5.00% | 10.00% | 0.00% | 15.00% |
| 73 | 2.84 | | 1480 | Alumina | | 19.05% | 47.62% | 0.00% | 23.81% | 0.00% | 0.00% | 9.52% |
| 75 | 2.77 | | 1390 | Alumina | | 19.05% | 57.14% | 0.00% | 14.29% | 0.00% | 0.00% | 9.52% |
| 117 | 2.98 | | 1390 | Alumina | | 11.00% | 50.00% | 0.00% | 25.00% | 0.00% | 0.00% | 14.00% |
| 118 | 2.89 | | 1390 | Alumina | | 9.00% | 60.00% | 0.00% | 22.00% | 0.00% | 0.00% | 9.00% |
| 119 | 3.01 | | 1480 | Alumina | | 12.00% | 0.00% | 50.00% | 20.00% | 0.00% | 0.00% | 18.00% |
| 120 | 2.88 | | 1480 | Alumina | | 15.00% | 0.00% | 60.00% | 15.00% | 0.00% | 0.00% | 10.00% |
| 121 | 2.95 | 725.8 | 1480 | Alumina | 11.00% | | 50.00% | | 25.00% | | | 14.00% |
| 122 | 2.88 | | 1480 | Alumina | 12.00% | | 50.00% | | 20.00% | | | 18.00% |

Primary Network Former: Silica Sand or Cullet and Recycled Concrete
Crucible: Alumina

| Melt # | Specific Gravity | Knoop Hardness | Temp. °C. | Crucible | Sand | Cullet | Recycled Concrete | Magnetite | Limestone | Sodium Carbonate | Charcoal |
|---|---|---|---|---|---|---|---|---|---|---|---|
| 123 | 2.73 | | 1480 | Alumina | 0.00% | 10.00% | 40.00% | 35.00% | 15.00% | | 0.00% |
| 135 | 2.87 | | 1480 | Alumina | 0.00% | 9.50% | 38.00% | 33.25% | 14.25% | | 5.00% |
| 136 | 3.10 | 679.1 | 1390 | Alumina | 10.00% | 0.00% | 40.00% | 35.00% | 15.00% | | 0.00% |
| 139 | 3.12 | 625.9 | 1390 | Alumina | 0.00% | 0.00% | 60.00% | 30.00% | 5.00% | | 5.00% |
| 137 | 2.76 | | 1290 | Alumina | 0.00% | 0.00% | 60.00% | 30.00% | 5.00% | | 5.00% |
| 138 | 3.08 | | 1290 | Alumina | 0.00% | 5.00% | 60.00% | 30.00% | 5.00% | | 0.00% |
| 140 | 2.75 | 618.0 | 1490 | Alumina | 0.00% | 5.00% | 70.00% | 10.00% | 10.00% | | 5.00% |
| 141 | 2.59 | 614.2 | 1490 | Alumina | 0.00% | 0.00% | 100.00% | 0.00% | 1.00% | | 0.00% |
| 142 | 2.76 | | 1390 | Alumina | 0.00% | 0.00% | 60.00% | 30.00% | 4.00% | | 5.00% |
| 147 | 2.33 | | 1490 | Alumina | 0.00% | 0.00% | 96.00% | 0.00% | 0.00% | 4.00% | 0.00% |
| 148 | 2.28 | | 1490 | Alumina | 0.00% | 0.00% | 94.00% | 0.00% | 0.00% | 6.00% | 0.00% |
| 149 | 2.42 | | 1390 | Alumina | 0.00% | 0.00% | 92.00% | 0.00% | 0.00% | 8.00% | 0.00% |
| 150 | 2.82 | 517.5 | 1390 | Alumina | 0.00% | 10.20% | 51.02% | 30.61% | 0.00% | 8.16% | 0.00% |
| 151 | 2.77 | 551.6 | 1390 | Alumina | 0.00% | 20.40% | 40.82% | 30.61% | 0.00% | 8.16% | 0.00% |
| 152 | 2.78 | 581.9 | 1390 | Alumina | 0.00% | 30.61% | 30.61% | 30.61% | 0.00% | 8.16% | 0.00% |
| 152 | 2.78 | 581.9 | 1390 | Alumina | 0.00% | 30.61% | 30.61% | 30.61% | 0.00% | 8.16% | 0.00% |
| 154 | 2.91 | | 1290 | Alumina | 0.00% | 5.00% | 60.00% | 30.00% | 5.00% | 0.00% | 0.00% |
| 155 | 2.83 | | 1290 | Alumina | 0.00% | 10.00% | 50.00% | 25.00% | 5.00% | 10.00% | 0.00% |
| 156 | 2.56 | | 1290 | Alumina | 0.00% | 15.00% | 50.00% | 15.00% | 10.00% | 10.00% | 0.00% |
| 157 | 2.70 | | 1290 | Alumina | 0.00% | 17.25% | 47.50% | 10.00% | 15.00% | 10.00% | 0.00% |

Recycled Concrete
Crucible: Alumina

| Melt # | Specific Gravity | Knoop Hardness | Temp. °C. | Crucible | Sand | Cullet | Recycled Concrete | Manganese Dioxide | Limestone | Sodium Carbonate | Sodium Sulfate |
|---|---|---|---|---|---|---|---|---|---|---|---|
| 158 | | | 1490 | Alumina | 0.00% | 5.00% | 86.00% | 1.00% | 0.00% | 8.00% | 0.00% |
| 159 | | | 1490 | Alumina | 0.00% | 10.00% | 81.50% | 0.50% | 0.00% | 8.00% | 0.00% |
| 160 | | | 1490 | Alumina | 0.00% | 15.00% | 76.50% | 0.25% | 0.00% | 8.00% | 0.00% |
| 161 | | | 1490 | Alumina | 0.00% | 14.75% | 76.50% | 0.50% | 0.00% | 8.00% | 0.00% |
| 162 | | | 1490 | Alumina | 0.00% | 20.00% | 71.75% | 0.25% | 0.00% | 8.00% | 0.00% |
| 163 | | | 1490 | Alumina | 0.00% | 25.00% | 66.75% | 0.25% | 0.00% | 8.00% | 0.00% |
| 164 | | | 1490 | Alumina | 0.00% | 30.00% | 61.75% | 0.25% | 0.00% | 8.00% | 0.00% |
| 165 | | | 1490 | Alumina | 0.00% | 35.00% | 56.00% | 1.00% | 0.00% | 8.00% | 0.00% |
| 167 | | | 1490 | Alumina | 0.00% | 44.00% | 46.00% | 1.00% | 0.00% | 8.00% | 1.00% |
| 168 | | | 1490 | Alumina | 0.00% | 54.00% | 36.00% | 1.00% | 0.00% | 8.00% | 1.00% |
| 169 | | | 1490 | Alumina | 0.00% | 64.00% | 26.00% | 1.00% | 0.00% | 8.00% | 1.00% |
| 170 | | | 1490 | Alumina | 0.00% | 74.00% | 16.00% | 1.00% | 0.00% | 8.00% | 1.00% |
| 171 | | | 1490 | Alumina | 0.00% | 80.00% | 10.00% | 1.00% | 0.00% | 8.00% | 1.00% |
| 172 | | | 1490 | Alumina | 0.00% | 15.00% | 76.75% | 0.25% | 0.00% | 8.00% | 1.00% |

Primary Network Former: Cullet and Alumina
Crucible: Graphite or Alumina

| Melt # | Specific Gravity | Temp. °C. | Crucible | Cullet | Alumina | Iron (III) Oxide Fe2O3 | Recycled Iron/Steel | Calcium Oxide | Potassium Sulfate | Sodium Carbonate | Potassium Sulfate | Charcoal |
|---|---|---|---|---|---|---|---|---|---|---|---|---|
| 7 | 2.73 | 1400 | Graphite | 60.70% | 3.10% | 30.10% | 0.00% | 0.00% | 6.10% | 0.00% |  | 0.00% |
| 8 | 2.76 | 1400 | Graphite | 58.70% | 5.10% | 30.10% | 0.00% | 0.00% | 6.10% | 0.00% |  | 0.00% |
| 9 | 2.79 | 1400 | Graphite | 53.70% | 5.10% | 30.10% | 0.00% | 5.00% | 6.10% | 0.00% |  | 0.00% |
| 10 | 2.69 | 1380 | Graphite | 36.80% | 3.10% | 45.00% | 0.00% | 5.00% | 6.10% | 4.00% | 6.10% | 0.00% |
| 11 | 2.64 | 1380 | Graphite | 53.70% | 5.10% | 22.00% | 6.00% | 7.10% | 6.10% | 0.00% | 6.10% | 0.00% |
| 12 | 2.74 | 1380 | Graphite | 53.70% | 5.10% | 29.10% | 1.00% | 5.00% | 6.10% | 0.00% | 6.10% | 0.00% |
| 13 | 2.69 | 1380 | Graphite | 53.70% | 5.10% | 30.10% | 0.00% | 5.00% | 6.10% | 0.00% | 6.10% | 0.00% |
| 14 | 2.63 | 1380 | Graphite | 53.70% | 5.10% | 30.10% | 0.00% | 5.00% | 0.00% | 6.10% | 0.00% | 0.00% |
| 15 | 2.71 | 1380 | Graphite | 53.70% | 5.10% | 29.10% | 0.00% | 5.00% | 6.10% | 0.00% | 6.10% | 1.00% |
| 16 | 2.71 | 1380 | Graphite | 53.70% | 5.10% | 29.10% | 0.00% | 5.00% | 6.10% | 0.00% | 6.10% | 1.00% |
| 17 | 2.76 | 1380 | Graphite | 53.70% | 5.10% | 29.10% | 0.00% | 5.00% | 6.10% | 0.00% | 6.10% | 1.00% |
| 18 | 2.75 | 1380 | Graphite | 53.70% | 5.10% | 29.10% | 0.00% | 5.00% | 6.10% | 0.00% | 6.10% | 1.00% |
| 19 | 2.79 | 1380 | Graphite | 53.70% | 5.10% | 29.10% | 0.00% | 5.00% | 6.10% | 0.00% | 6.10% | 1.00% |

Primary Network Former: Cullet and Iron-Alumina Silicate (Garnet)
Crucible: Graphite or Alumina

| Melt # | Specific Gravity | Knoop Hardness | Temp. °C. | Crucible | Cullet | Garnet | Iron (III) Oxide Fe2O3 | Sodium Carbonate | Potassium Sulfate | Charcoal |
|---|---|---|---|---|---|---|---|---|---|---|
| 5 | 2.66 |  | 1400 | Graphite | 53.50% | 13.13% | 24.81% | 0.00% | 8.56% | 0.00% |
| 6 | 2.74 |  | 1400 | Graphite | 47.18% | 22.86% | 21.40% | 0.00% | 8.56% | 0.00% |
| 84 | 2.67 | 667.4 | 1480 | Alumina |  | 95.00% |  | 5.00% |  |  |

[53]. The embodiments of the described amorphous silica products and method are not limited to the particular embodiments, components, method steps, and materials disclosed herein as such components, process steps, and materials may vary. Moreover, the terminology employed herein is used for the purpose of describing exemplary embodiments only and the terminology is not intended to be limiting since the scope of the various embodiments of the present invention will be limited only by the appended claims and equivalents thereof.

[54]. Therefore, while embodiments of the invention are described with reference to exemplary embodiments, those skilled in the art will understand that variations and modifications can be affected within the scope of the invention as defined in the appended claims. Accordingly, the scope of the various embodiments of the present invention should not be limited to the above discussed embodiments and should only be defined by the following claims and all equivalents.

The invention claimed is:

1. A method of producing an amorphous silica material, comprising:
preparing a batch comprising concrete;
melting the batch in a furnace to melt effluent;
cooling the melt effluent to form amorphous silica particles, mass or product; and
crushing the amorphous silica particles, mass or product to form glass particles.

2. The method of claim 1, wherein the batch comprises at least one flux.

3. The method of claim 2, wherein the at least one flux is in a concentration range from 1 wt. % to 30 wt. %.

4. The method of claim 1, wherein the batch comprises at least one of a metal oxide, a metal silicate, and a metal.

5. The method of claim 4, wherein the at least one of the metal oxide, the metal silicate, and the metal comprises iron oxide.

6. The method of claim 4, wherein the at least one of the metal oxide, the metal silicate, and the metal consists essentially of iron oxide.

7. The method of claim 1, wherein the batch comprises a calcium containing material.

8. The method of claim 1, wherein the batch comprises at least one of limestone and calcium oxide.

9. The method of claim 8, wherein the limestone is in a concentration range from 5 wt. % to 20 wt. %.

10. A method of producing an amorphous silica material, comprising:
preparing a batch comprising concrete and glass cullet;
melting the batch in a furnace to melt effluent; and
cooling the melt effluent to form amorphous silica particles, mass or product.

11. The method of claim 10, wherein the glass cullet is in a concentration range from 1 wt. % to 80 wt. %.

12. The method of claim 10, wherein the glass cullet is in a concentration range from 1 wt. % to 50 wt. %.

13. The method of claim 10, wherein the glass cullet is in a concentration range from 1 wt. % to 25 wt. %.

14. The method of claim 10, wherein the glass cullet is in a concentration range from 10 wt. % to 50 wt. %.

15. The method of claim 10, wherein the batch comprises flux and a decolorizer.

16. The method of claim 15, wherein the cullet is in a concentration range from 25 wt. % to 50 wt. %.

17. The method of claim 16, wherein the flux is a sodium flux and the sodium flux is in a concentration range from 2 wt. % to 15 wt. %.

18. The method of claim 17, wherein the decolorizer is manganese, manganese dioxide, selenium, or cerium oxide and is in a concentration range from 0.25 wt. % to 5 wt. %.

19. A method of producing an amorphous silica material, comprising:
preparing a batch comprising concrete and an iron oxide;
melting the batch in a furnace to melt effluent; and
cooling the melt effluent to form amorphous silica particles, mess or product, wherein the iron oxide is magnetite.

20. The method of claim 19, wherein the iron oxide is in a concentration range of from 1 wt. % to 40 wt. %.

21. The method of claim 19, wherein the iron oxide is in a concentration range of from 10 wt. % to 40 wt. %.

22. The method of claim 19, wherein the iron oxide is in a concentration range of from 20 wt. % to 40 wt. %.

23. A method of producing an amorphous silica material, comprising:
preparing a batch comprising concrete and limestone;
melting the batch in a furnace to melt effluent; and
cooling the melt effluent to form amorphous silica particles, mass or product, wherein the limestone is in a concentration range from 1 wt. % to 30 wt. %.

24. A method of producing an amorphous silica material, comprising:
preparing a batch comprising concrete and silica sand;
melting the batch in a furnace to melt effluent; and
cooling the melt effluent to form amorphous silica particles, mass or product.

25. The method of claim 24, wherein the silica sand is in a concentration range from 1 wt. % to 30 wt. %.

26. The method of claim 24, wherein the silica sand is in a concentration range from 5 wt. % to 20 wt. %.

27. A method of producing an amorphous silica material, comprising:
preparing a batch comprising concrete and at least one of slag, mineral slag, and metal slag;
melting the batch in a furnace to melt effluent; and
cooling the melt effluent to form amorphous silica particles, mass or product.

28. The method of claim 27, wherein the at least one of the slag, the mineral slag, and the metal slag is in a concentration range from 1 wt. % to 30 wt. %.

29. The method of claim 27, wherein the at least one of the slag, the mineral slag, and the metal slag is in a concentration range from 5 wt. % to 20 wt. %.

* * * * *